March 18, 1969    R. W. PETERSON    3,433,314
JACK-TYPE WEIGHER WITH CANTILEVER SPRING
Filed Aug. 14, 1967    Sheet 1 of 2
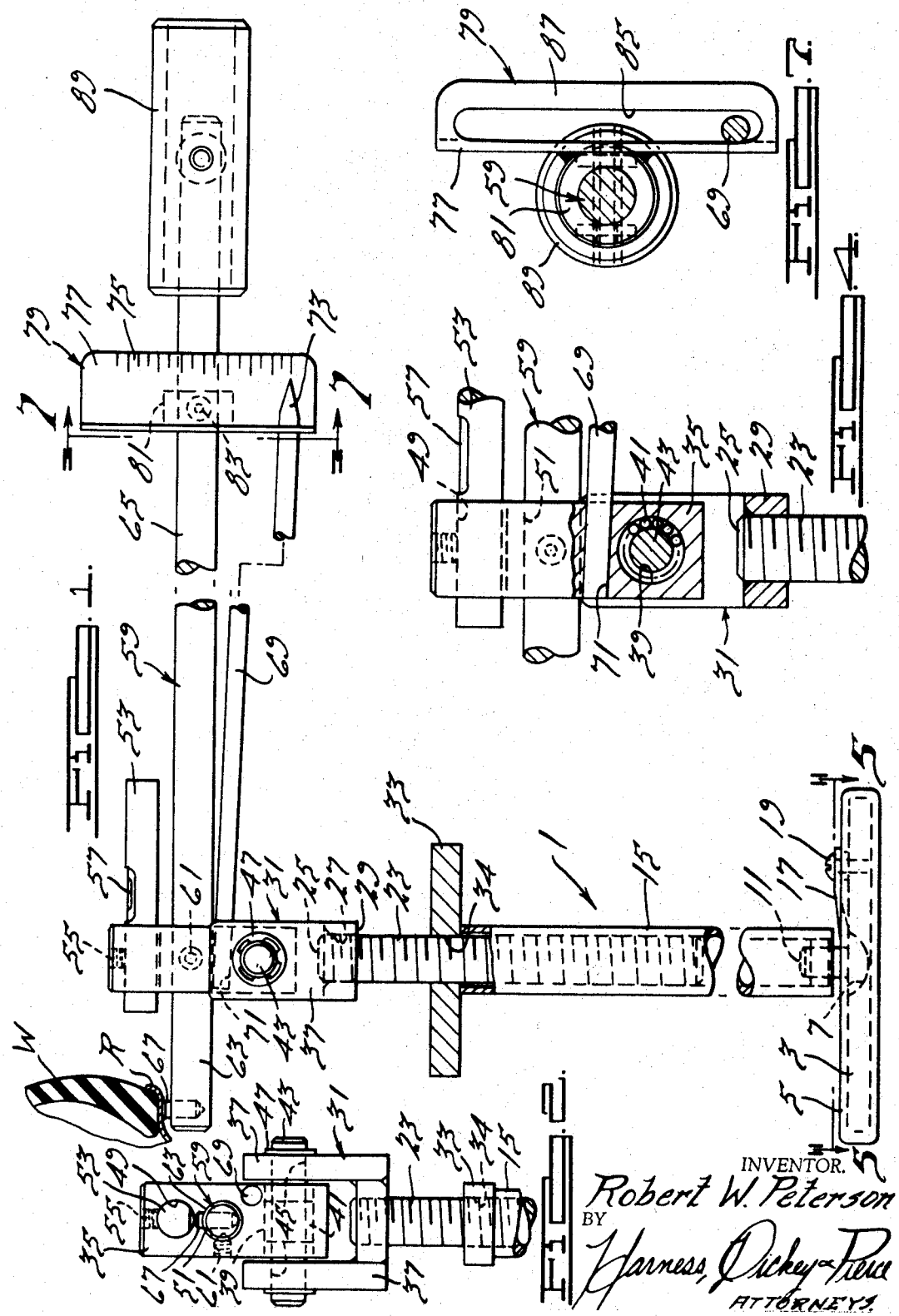

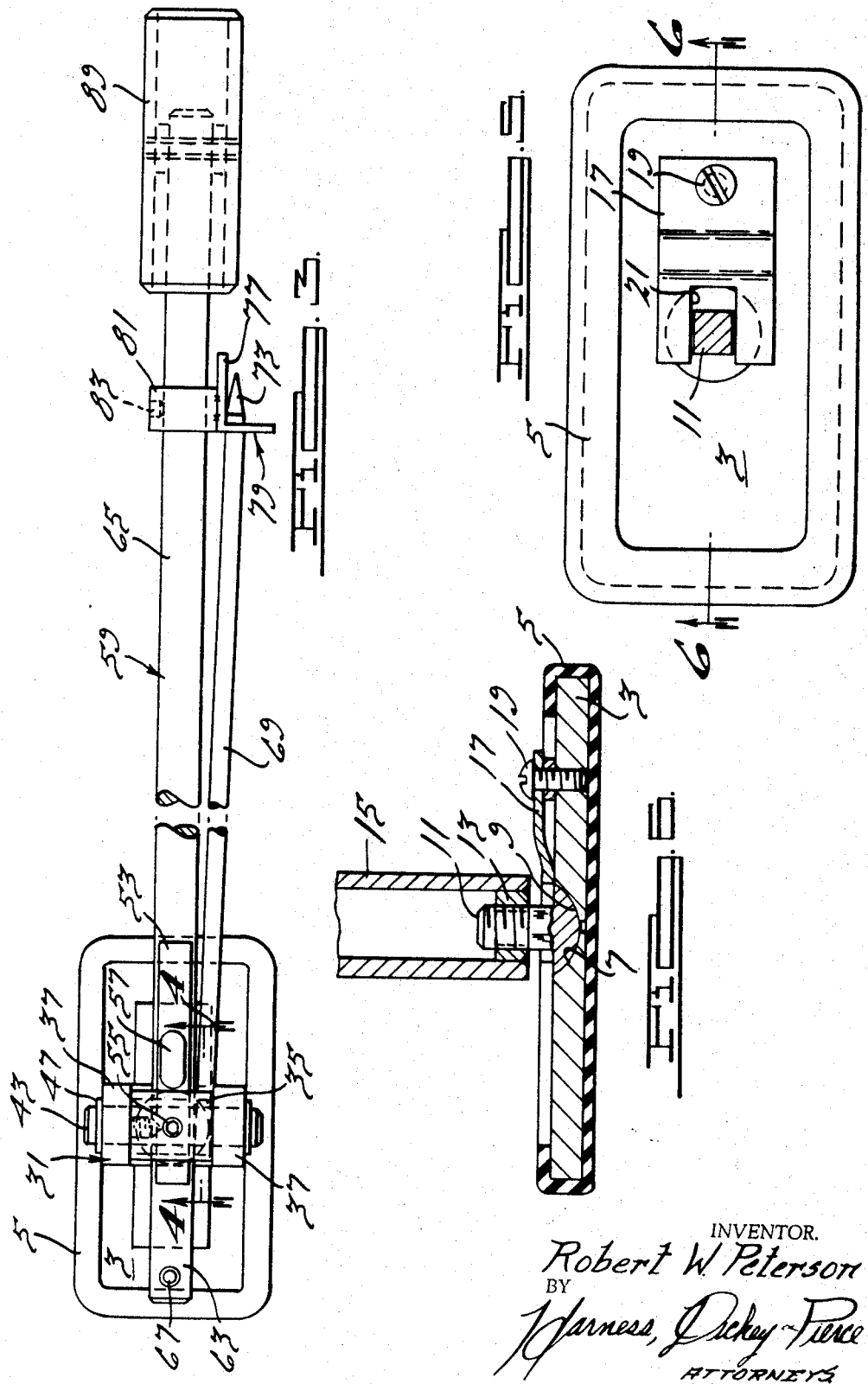

United States Patent Office 3,433,314
Patented Mar. 18, 1969

3,433,314
JACK-TYPE WEIGHER WITH
CANTILEVER SPRING
Robert W. Peterson, Park Ridge, Ill., assignor to Walker Manufacturing Company, Racine, Wis., a corporation of Delaware
Filed Aug. 14, 1967, Ser. No. 660,462
U.S. Cl. 177—146                9 Claims
Int. Cl. G01g 19/52, 19/02

ABSTRACT OF THE DISCLOSURE

A light, portable, adjustable stand with a transverse lever to engage and lift the rim of a racing car wheel has a liquid level to show the correct position to start the lift and a pointer co-operating with a scale that is calibrated to indicate by bending of the lever how much weight is lifted.

Background of the invention

Automobile racing drivers and mechanics believe it is desirable to distribute the weight in and of a vehicle in a certain manner on to each of the four wheels. The purpose of the present invention is to provide a device that will quickly and accurately determine the weight on each wheel and of such a construction that it can be disassembled into a compact package that may be easily carried from one place to another.

Brief summary of the invention

A device embodying the invention preferably includes an adjustable stand for supporting a lever bar at a desired height and indicating when it is in a horizontal position. The stand preferably includes a block pivoted on bearings which carries the lever bar and a fixed pointer. A calibrated scale carried by the bar is swept by the pointer as the bar bends when a wheel is elevated and indicates the pounds being lifted.

Description of the drawings

FIGURE 1 is a side elevation of a device embodying the invention;

FIGURE 2 is a partial side elevation taken from the left of FIGURE 1;

FIGURE 3 is a partial plan view taken of the top of the structure of FIGURE 1;

FIGURE 4 is a section along line 4—4 of FIGURE 1;

FIGURE 5 is an enlarged section along line 5—5 of FIGURE 1;

FIGURE 6 is a section along line 6—6 of FIGURE 5; and

FIGURE 7 is an enlarged section along the line 7—7 of FIGURE 1.

Description of the invention

The weight distribution measuring device 1 for racing cars or the like comprises a flat stand plate 3 that is preferably covered with a rubber pad 5 (FIGURE 6). It has a partially spherical recess 7 in its top face which receives the partially spherical head 9 of a square neck carriage bolt 11 that threads into a nut 13 which is welded inside the bottom end of a tubular jack stand or post 15. A cantilever retaining plate 17 of resilient steel is attached at one end by screw 19 to the top of base plate 3 and has a rectangular slot 21 opening out of the other end that receives the square neck of bolt 11 whereby the plate 17 acts to hold the bolt head 9 on its seat 7.

An adjusting screw 23 extends into the post 15 and is welded at its top end 25 inside an opening 27 in the bottom 29 of a yoke 31. A stop plate 33 rests on the top end of post 15 and has a threaded opening 34 through which the screw 23 is threaded.

A mounting block 35 is disposed between the two sides 37 of the yoke 31 and has a transverse aperture 39 containing a needle bearing 41. A pivot pin 43 is centrally supported in the bearing 41 and its end portions are supported in apertures 45 in the sides 37 of the yoke. Self-locking snap rings 47 fit in grooves on the ends of the pin 43 to hold it in position.

The block 35 has a first transverse bore 49 adjacent its top end and a second and parallel transverse bore 51 just below the bore 49, both of which extend at right angles to the lengths of the block and parallel to the axis of the pivot pin 43 and bearing 41. A line level device 53 is held by set screw 55 in the top bore 49 and has the conventional liquid containing indicator 57 to indicate when the device 53 is truly horizontal which in turn indicates when the bore 51 is truly horizontal. It will be noted that because of the spherical mounting provided by bolt head 9 the post 15 can be easily adjusted in its vertical position even to a plane which contains the axes of the bores 49 and 51 and which is perpendicular to the axis of the pivot pin 43.

A bar or lever arm 59 is fitted in the bore 51 and held in position by set screw 61 so that a short portion 63 extends on one side of the block and a much longer portion 65 extends from the other side of the block. A short pointed pin 67 projects upwardly from the bar portion 63 and is located so that its axis lies in the plane of the axes of bores 49 and 51 and perpendicular to the axis of pivot pin 43.

An indicator rod 69 is secured in a bore 71 in the block 35 and extends in the direction of the bar 59. The bore 71, however, is inclined slightly with respect to bore 51, preferably making an angle of 2°15', so that the axis of rod 69 also makes a slight angle with the axis of the bar 59. The free end 73 of the rod 69 is pointed and sweeps across a vertically extending, calibrated scale 75 on one side 77 of an angle shaped bracket 79 which is welded to a block 81 that is mounted on bar 59 and secured in place by a set screw 83. The rod 69 extends through a slot 85 in the other side 87 of bracket 79.

A hand grip 89 is mounted on the outer end of long portion 65 of the lever bar 59. It serves as a means for an operator using the device to apply a downward force on the outer end of lever bar 59. This is done after the screw 23 is adjusted so that the line level 53 indicates that bar 59 extends horizontally when the tip of pin 67 engages the rim R of the wheel W to be lifted. The downward force on handle 89 raises the pin 67 (block 35 pivoting on pin 43 and bearing 41) and lifts the wheel W but also causes the lever portion 65 to bend and therefore change the angle between it and the indicator rod 69. As it bends the scale 75 moves relative to the pointed end of rod 69 and when the wheel W is lifted from the ground the scale will indicate the weight of the wheel. By so lifting each of the four wheels of a racing car, a mechanic can quickly tell whether the desired weight distribution on the wheels has been obtained.

It is apparent that the major sections of the device 1 may be readily folded and/or disassembled (as by unscrewing screw 23) so that the device may be carried about in a small, compact case.

Modifications may be made without departing from the spirit and scope of the invention.

I claim:

1. A device for measuring the load on a wheel of a racing car or the like comprising an adjustable vertical stand, a horizontally extending lever, means pivotally supporting the lever at an intermediate point along its length on said stand, the first portion of said lever on one side of its pivotal support being adapted to engage a wheel to apply a lifting force to the wheel, the second portion of said lever on the other side of its pivotal support being substantially longer and adapted to receive a downward force whereby a lifting force is applied by the first portion of the lever to a wheel, said lever being of a cross section and length such that said second portion bends a significant amount as a cantilever when force is applied to lift a wheel, a calibrated scale carried by a bendable portion of said lever, and a pointer rod co-operating at one end with said scale and supported at its other end on said pivotal support means to pivot with said lever, said lever bending under load relative to said rod so that said scale sweeps said rod to indicate by bending of the lever the magnitude of the weight being lifted, and level means indicating when the lever is in a horizontal position prior to lifting.

2. A device as set forth in claim 1 wherein said stand includes a base plate, a hollow post swivelly supported on said base plate, a stop plate engaging the top of the post, and an adjusting screw threaded through said stop plate and telescoping inside said post.

3. A device as set forth in claim 2 including means removably supporting the post on the plate.

4. A device as set forth in claim 1 wherein said means comprises a block pivotally carried by the top of the stand, said lever extending through said block and said rod being supported on said block.

5. A device as set forth in claim 4 wherein said stand includes a vertically extending and adjustable support screw, a yoke carried at the top of said screw, said block being pivoted on said yoke.

6. A device as set forth in claim 5 wherein said level means is mounted on said block.

7. A device as set forth in claim 6 wherein said block includes a bearing and a pin carried by said bearing and supported at opposite ends in said yoke.

8. A device as set forth in claim 7 wherein said stand includes a base plate and a hollow post, a ball and socket joint mounting said post on said base plate, and resilient means on said plate removably holding said post in said joint.

9. A device as set forth in claim 8 including a stop plate engaging the top of the post, said screw threading through said stop plate and telescoping inside said post.

References Cited

UNITED STATES PATENTS

| 52,653 | 2/1866 | Ehrhardt | 177—146 |
| 1,640,967 | 8/1927 | Siebenmann | 177—146 |
| 3,185,235 | 5/1965 | Mittelsteadt | 177—264 XR |

FOREIGN PATENTS 424,617   1/1926   Germany.

ROBERT S. WARD, JR., *Primary Examiner.*

U.S. Cl. X.R.

177—126, 229